United States Patent
Khan

(10) Patent No.: US 10,423,951 B2
(45) Date of Patent: *Sep. 24, 2019

(54) METHODS, SYSTEMS, AND COMPUTER READABLE MEDIA FOR FACILITATING IN-STORE OR NEAR-STORE ORDERING AND PAYMENT OF GOODS AND SERVICES THROUGH A SINGLE-TAP OF A NEAR FIELD COMMUNICATION (NFC) DEVICE

(71) Applicant: MasterCard International Incorporated, Purchase, NY (US)

(72) Inventor: Mohammad Khan, San Jose, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 72 days.

This patent is subject to a terminal disclaimer.

(21) Appl. No.: 15/385,362

(22) Filed: Dec. 20, 2016

(65) Prior Publication Data

US 2017/0132609 A1 May 11, 2017

Related U.S. Application Data

(63) Continuation of application No. 13/171,128, filed on Jun. 28, 2011, now Pat. No. 9,536,243.

(Continued)

(51) Int. Cl.
*G06Q 20/32* (2012.01)
*G06Q 20/04* (2012.01)
(Continued)

(52) U.S. Cl.
CPC ..... *G06Q 20/3278* (2013.01); *G06Q 20/0457* (2013.01); *G06Q 20/20* (2013.01);
(Continued)

(58) Field of Classification Search
None
See application file for complete search history.

(56) References Cited

U.S. PATENT DOCUMENTS

| 6,491,217 B2 | 12/2002 | Catan |
| 7,469,151 B2 | 12/2008 | Khan et al. |

(Continued)

FOREIGN PATENT DOCUMENTS

| CA | 2732869 | 7/2017 |
| CN | 101035162 A | 9/2007 |

(Continued)

OTHER PUBLICATIONS

Advisory Action for U.S. Appl. No. 13/118,046 (dated Jan. 4, 2018).

(Continued)

*Primary Examiner* — Fateh M Obaid
(74) *Attorney, Agent, or Firm* — Jenkins, Wilson, Taylor & Hunt, P.A.

(57) ABSTRACT

Methods, systems, and computer readable media for facilitating in-store or near-store ordering and payment of goods and/or services through a single tap of a near field communication (NFC) device are disclosed. In one embodiment, a system can include a smart poster locatable in an area that is accessible to a potential consumer of goods or services. The system can further include a mechanism in or on the smart poster for directing the NFC enabled device to access a portion of a merchant ordering and payment system specific to the good or service advertised by the smart poster. The system can further include a wallet application residing on the NFC enabled device that upon interfacing with the smart poster downloads, submits, and pays for an order of the good or service advertised by the smart poster via the single NFC tap.

24 Claims, 4 Drawing Sheets

Related U.S. Application Data

(60) Provisional application No. 61/359,122, filed on Jun. 28, 2010.

(51) Int. Cl.

| | | |
|---|---|---|
| *G06Q 20/20* | (2012.01) | |
| *G06Q 20/36* | (2012.01) | |
| *G06Q 30/00* | (2012.01) | |
| *G06Q 30/06* | (2012.01) | |
| *G06Q 30/02* | (2012.01) | |

(52) U.S. Cl.
CPC ......... *G06Q 20/3223* (2013.01); *G06Q 20/36* (2013.01); *G06Q 20/367* (2013.01); *G06Q 30/00* (2013.01); *G06Q 30/0241* (2013.01); *G06Q 30/0601* (2013.01)

(56) References Cited

U.S. PATENT DOCUMENTS

| | | | |
|---|---|---|---|
| 7,707,113 | B1 | 4/2010 | DiMartino et al. |
| 8,626,591 | B2 | 1/2014 | Ablowitz et al. |
| 8,849,705 | B2 | 9/2014 | Khan et al. |
| 8,965,800 | B2 | 2/2015 | Soysa et al. |
| 9,536,243 | B2 | 1/2017 | Khan |
| 2002/0063034 | A1 | 5/2002 | Dobbins |
| 2004/0054591 | A1 | 3/2004 | Spaeth et al. |
| 2004/0243519 | A1 | 12/2004 | Perttila et al. |
| 2005/0070257 | A1 | 3/2005 | Saarinen et al. |
| 2005/0256781 | A1 | 11/2005 | Sands et al. |
| 2006/0165060 | A1 | 7/2006 | Dua |
| 2006/0236325 | A1 | 10/2006 | Rao et al. |
| 2007/0016479 | A1 | 1/2007 | Lauper |
| 2007/0042756 | A1* | 2/2007 | Perfetto ............ H04M 3/42263 455/412.1 |
| 2007/0099599 | A1 | 5/2007 | Smith et al. |
| 2007/0203792 | A1 | 8/2007 | Rao |
| 2007/0224979 | A1 | 9/2007 | O'Neal et al. |
| 2008/0040354 | A1 | 2/2008 | Ray et al. |
| 2008/0114884 | A1 | 5/2008 | Hewes et al. |
| 2008/0192932 | A1 | 8/2008 | Graeber et al. |
| 2008/0262929 | A1 | 10/2008 | Behr |
| 2009/0144161 | A1 | 6/2009 | Fisher |
| 2009/0164322 | A1 | 6/2009 | Khan et al. |
| 2009/0170483 | A1 | 7/2009 | Barnett et al. |
| 2009/0192912 | A1 | 7/2009 | Griffin et al. |
| 2009/0193500 | A1* | 7/2009 | Griffin .................. G06Q 20/10 726/2 |
| 2009/0216606 | A1 | 8/2009 | Coffman et al. |
| 2009/0288012 | A1 | 11/2009 | Hertel et al. |
| 2010/0030636 | A1 | 2/2010 | Vijayshankar et al. |
| 2010/0075666 | A1 | 3/2010 | Garner |
| 2010/0081374 | A1 | 4/2010 | Moosavi |
| 2010/0088188 | A1 | 4/2010 | Kumar et al. |
| 2010/0161410 | A1* | 6/2010 | Tulloch .................. G06Q 30/02 705/14.45 |
| 2010/0185504 | A1 | 7/2010 | Rajan et al. |
| 2011/0060637 | A1 | 3/2011 | Sakai et al. |
| 2011/0082746 | A1 | 4/2011 | Rice et al. |
| 2011/0106635 | A1* | 5/2011 | Khan .................... G06Q 20/12 705/14.73 |
| 2011/0251892 | A1* | 10/2011 | Laracey ............. G06Q 30/0253 705/14.51 |
| 2011/0264490 | A1 | 10/2011 | Durvasula et al. |
| 2011/0307318 | A1 | 12/2011 | LaPorte et al. |
| 2011/0320293 | A1 | 12/2011 | Khan |
| 2012/0005026 | A1 | 1/2012 | Khan et al. |
| 2013/0238456 | A1 | 9/2013 | Soysa et al. |

FOREIGN PATENT DOCUMENTS

| | | |
|---|---|---|
| CN | 101472238 A | 7/2009 |
| EP | 1 528 518 A1 | 5/2005 |
| EP | 2 355 063 A1 | 8/2011 |
| KR | 10-2006-0097187 A | 9/2006 |
| KR | 10-2007-0095472 A | 10/2007 |
| KR | 10-2008-0021436 A | 3/2008 |
| KR | 10-2009-0048494 A | 5/2009 |
| WO | WO 2006/055721 A2 | 5/2006 |
| WO | WO 2007/026982 A1 | 3/2007 |
| WO | WO 2008/028555 A2 | 3/2008 |
| WO | WO 2008/030307 A2 | 3/2008 |
| WO | WO 2008/066989 A1 | 6/2008 |
| WO | WO 2008/087431 A1 | 7/2008 |
| WO | WO 2009/039419 A1 | 3/2009 |
| WO | WO 2009/158681 A1 | 12/2009 |
| WO | WO 2011/053914 A2 | 5/2011 |
| WO | WO 2011/112158 A1 | 9/2011 |
| WO | WO 2011/150369 A2 | 12/2011 |
| WO | WO 2012/006098 A2 | 1/2012 |
| WO | WO 2013/134769 A1 | 9/2013 |

OTHER PUBLICATIONS

Final Office Action for U.S. Appl. No. 13/118,046 (dated Oct. 24, 2017).
Notice of Allowance and Fee(s) Due for U.S. Appl. No. 13/171,128 (dated Aug. 30, 2016).
Communication of extended European search report for European Patent Application No. 13758571.7 (dated Nov. 5, 2015).
Final Office Action for U.S. Appl. No. 13/171,128 (dated Oct. 8, 2015).
Non-Final Office Action for U.S. Appl. No. 13/171,128 (dated Feb. 20, 2015).
Communication of European Publication Number and Information on the Application of Article 67(3) EPC for European Patent Application No. 13758571.7 (dated Dec. 17, 2014).
Notice of Allowance and Fee(s) Due for U.S. Appl. No. 13/793,813 (dated Oct. 24, 2014).
Final Office Action for U.S. Appl. No. 13/171,128 (dated Oct. 9, 2014).
Non-Final Office Action for U.S. Appl. No. 13/171,128 (dated May 22, 2014).
Non-Final Office Action for U.S. Appl. No. 13/793,813 (dated Apr. 8, 2014).
Final Office Action for U.S. Appl. No. 13/171,128 (dated Oct. 23, 2013).
Notification of Transmittal of the International Search Report and the Written Opinion of the International Searching Authority, or the Declaration for International Application No. PCT/US2013/030216 (dated Jun. 20, 2013).
Communication of European Publication Number and Information on the Application of Article 67(3) EPC for European Patent Application No. 11804135.9 (dated Apr. 4, 2013).
Non-Final Office Action for U.S. Appl. No. 13/171,128 (dated Mar. 1, 2013).
Notification of Transmittal of the International Search Report and the Written Opinion of the International Searching Authority, or the Declaration for International Application No. PCT/US2011/042207 (dated Jan. 2, 2012).
Commonly Assigned, Co-pending U.S. Appl. No. 13/171,128 for "Methods, Systems, and Computer Readable Media for Facilitating In-Store or Near-Store Ordering and Payment of Goods and Services Through a Single-Tap of a Near Field Communication (NFC) Device," (filed Jun. 28, 2011).
"Information technology—Telecommunications and information exchange between systems—Near Field Communications—Interface and Protocol (NFCIP-1)," ISO/IEC 18092, pp. 1-66 (Apr. 1, 2004).
"Identification cards—Contactless integrated circuit(s) cards—Proximity cards—Part 2: Radio frequency power and signal interface," ISO/IEC 14443-2, pp. 1-10 (Jul. 22, 2003).
"Identification cards—Contactless integrated circuit(s) cards—Proximity cards—Part 4: Transmission protocol," ISO/IEC 14443-4, pp. 1-39 (Mar. 10, 2000).
"Identification cards—Contactless integrated circuit(s) cards—Proximity cards—Part 3: Initialization and anticollision," ISO/IEC 14443-3, pp. 1-48 (Jun. 11, 1999).

(56) References Cited

OTHER PUBLICATIONS

Appeal Board Decision for U.S. Appl. No. 13/118,046 (dated Sep. 14, 2016).
Notice of Grant for Chinese Patent Application No. 201080059946.5 (dated Jul. 27, 2016).
Summons to Attend Oral Proceedings pursuant to Rule 115(1) EPC for European Patent Application No. 11 787 521.1 (Jun. 29, 2016).
Extended European Search Report for European Patent Application No. 10827606.4 (dated May 6, 2016).
Examiner's Answer for U.S. Appl. No. 13/118,046 (dated Apr. 4, 2016).
Third Office Action for Chinese Patent Application No. 201080059946.5 (dated Jan. 20, 2016).
Communication pursuant to Article 94(3) EPC for European Application No. 11 787 521.1 (dated Dec. 17, 2015).
Communication pursuant to Article 94(3) EPC for European Application No. 11 787 521.1 (dated Jul. 15, 2015).
Second Office Action for Chinese Patent Application No. 201080059946.5 (dated Jul. 10, 2015).
Final Office Action for U.S. Appl. No. 13/118,046 (dated Feb. 27, 2015).
Applicant-Initiated Interview Summary for U.S. Appl. No. 13/118,046 (dated Jan. 23, 2015).
First Office Action for Chinese Patent Application No. 201080059946.5 (dated Nov. 2, 2014).
Communication pursuant to Article 94(3) EPC for European Patent Application No. 11787521.1 (dated Oct. 27, 2014).
Non-Final Office Action for U.S. Appl. No. 13/118,046 (dated Sep. 25, 2014).
Extended European Search Report for European Application No. 11804135.9 (dated Jul. 24, 2014).
Notice of Allowance and Fee(s) Due for U.S. Appl. No. 12/917,191 (dated Jun. 4, 2014).
Interview Summary for U.S. Appl. No. 12/917,191 (dated Apr. 30, 2014).
Non-Final Office Action for U.S. Appl. No. 13/118,046 (dated Apr. 16, 2014).
Extended European Search Report for European Application No. 11787521.1 (dated Feb. 28, 2014).
Final Office Action for U.S. Appl. No. 12/917,191 (dated Jan. 27, 2014).
Final Office Action for U.S. Appl. No. 13/118,046 (dated Oct. 2, 2013).
Non-Final Office Action for U.S. Appl. No. 12/917,191 (dated Aug. 21, 2013).
Communication of European Publication Number and Information on the Application of Article 67(3) EPC for European Patent Application No. 11787521.1 (dated Mar. 13, 2013).
Non-Final Official Action for U.S. Appl. No. 13/118,046 (dated Oct. 3, 2012).
Final Official Action for U.S. Appl. No. 12/917,191 (dated Oct. 3, 2012).
Communication of European Publication Number and Information on the Application of Article 67(3) EPC for European Patent Application No. 10827606.4 (dated Aug. 8, 2012).
Non-Final Official Action for U.S. Appl. No. 12/917,191 (dated May 2, 2012).
Notification of Transmittal of the International Search Report and the Written Opinion of the International Searching Authority, or the Declaration for International Application No. PCT/US2011/038408 (dated Feb. 29, 2012).
Notification of Transmittal of the International Search Report and Written Opinion of the International Searching Authority, or the Declaration for International Application No. PCT/US2011/042207 (dated Jan. 2, 2012).
Notification of Transmittal of the International Search Report and the Written Opinion of the International Searching Authority, or the Declaration for International Application No. PCT/US2010/054978 (dated Jun. 24, 2011).
PR Newswire, "Reportlinker Adds Mobile Coupons & NFC Smart Posters: Strategies, Applications & Forecasts 2009-2014," pp. 1-9 (Nov. 20, 2009).
Latif et al., "Automated Notification and Document Downloading in E-Learning—Development of an Agent-Based Framework Utilizing the Push-Pull Technology Interaction Policy," International Symposium on Information Technology, IEEE, pp. 1-7 (Aug. 2008).
Non-Final Office Action for U.S. Appl. No. 13/118,046 (dated Jun. 20, 2017).
Communication pursuant to Article 94(3) EPC for European Application No. 11 787 521.1 (dated Feb. 6, 2017).
Summons to attend oral proceedings pursuant to Rule 115(1) EPC for European Patent Application No. 09803712.0 (Apr. 28, 2017).
Communication pursuant to Article 94(3) EPC for European Application No. 13 758 571.7 (dated Mar. 13, 2017).
Communication pursuant to Article 94(3) EPC for European Patent Application Serial No. 11 804 135.9 (dated Jul. 17, 2018).
Notice of Allowance and Fee(s) Due for U.S. Appl. No. 13/236,243 (dated May 8, 2017).
Non-Final Office Action for U.S. Appl. No. 15/250,697 (dated Mar. 7, 2018).
Communication pursuant to Article 94(3) EPC for European Patent Application Serial No. 10 827 606.4 (dated Feb. 28, 2018).
Summons to Attend Oral Proceedings Pursuant to Rule 115(1) E PC for European Patent Application Serial No. 11787521.1 (dated Feb. 20, 2018).
Non-Final Office Action for U.S. Appl. No. 13/118,046 (dated Jul. 3, 2018).
Decision to Refuse a European Patent Application for European Patent Application No. 09 803 712.0 (dated Oct. 12, 2017).
Final Office Action for U.S. Appl. No. 13/118,046 (dated Mar. 19, 2019).
Non-Final Office Action for U.S. Appl. No. 13/118,046 (dated Nov. 13, 2018).
Summons to attend oral proceedings pursuant to Rule 115(1) EPC for European Patent Application Serial No. 11804135.9 (Jan. 7, 2019).
First Examination Report for Indian Patent Application Serial No. 4728/CHENP/2012 (dated Mar. 27, 2019).
Decision to refuse a European Patent application for European Patent Application Serial No. 11 787 521.1 (dated Nov. 7, 2018).
Advisory Action for U.S. Appl. No. 13/118,046 (dated May 31, 2019).
Summons to Attend Oral Proceedings pursuant to Rule 115(1) EPC for European Patent Application Serial No. 13758571.7 (May 29, 2019).

\* cited by examiner

METHODS, SYSTEMS, AND COMPUTER READABLE MEDIA FOR FACILITATING IN-STORE OR NEAR-STORE ORDERING AND PAYMENT OF GOODS AND SERVICES THROUGH A SINGLE-TAP OF A NEAR FIELD COMMUNICATION (NFC) DEVICE

RELATED APPLICATIONS

The present application is a continuation of U.S. patent application Ser. No. 13/171,128, filed Jun. 28, 2011, which claims the benefit of U.S. Provisional Patent Application Ser. No. 61/359,122, filed Jun. 28, 2010, the disclosures of each of which are incorporated herein by reference in their entireties.

TECHNICAL FIELD

The subject matter described herein relates to wireless smart devices. More particularly, the subject matter described herein relates to methods, systems, and computer readable media for facilitating in-store or near-store ordering and payment of goods and/or services through a single tap of a near field communication (NFC) enabled mobile device.

BACKGROUND

Wireless smart devices, such as near field communication (NFC) enabled devices, are becoming more prevalent in society for replacing conventional magnetic stripe cards. One advantage of NFC enabled devices over conventional magnetic stripe cards is that NFC enabled devices are often integrated within other devices, such as mobile telephones, that have additional hardware and software that may facilitate the obtaining of product information or the making of a purchase transaction. For example, NFC enabled devices may be integrated within mobile telephones, including smart phones, having hardware and software capable of performing purchase and information retrieval actions in addition to saving a consumer's preferences. In contrast, conventional magnetic stripe cards only provide the track 1 and track 2 data when read by a magnetic stripe reader and are incapable of obtaining or saving additional information about a product or service or of directing a consumer to alternate purchase channels.

One particular instance in which it may be desirable to use the enhanced capabilities of an NFC enabled device is when a consumer wants to place an order and pay for the order in a single step via a single tap of the NFC enabled device. This can include using a preselected payment option stored within a wallet application of device. Currently, the ordering and payment process is a multi-step process which can be both cumbersome and time consuming. The consumer must first read the menu-options and decide which option to purchase. The consumer must then place an order at a cashier station and pay for the order using traditional payment instruments such as cash, check, or payment cards. This process is not automated and has many areas for improvement. In this example, an order may optionally be placed by selecting a single item and/or multiple items via multiple NFC taps (e.g., tapping on a smart poster would select more than one meal/item, and then the order could be placed on the NFC enabled device by selecting a payment option communicated via device to a backend merchant server).

In another example, to date, consumers do not have an easy mechanism for saving his or her preferences for further orders using traditional payment instruments. In many instances, a consumer will visit the same store and place a repeat order for goods and/or services. Each time, the consumer must repeat the multi-step ordering and payment procedures. A need exists for allowing the merchant and/or consumer to save consumer preferences for future reuse. Traditional payments instruments are not capable of saving and/or conveying order information.

In a further example, it may be desirable to use the NFC enabled device communicate a table code to the merchant back end server via a single NFC tap such that merchant may know which table or location the order should be delivered to. Currently, traditional payment instruments are not capable of specifying delivery instructions.

Accordingly, there exists a long felt need for methods, systems, and computer readable media for facilitating ordering and payment of goods and/or services through a single tap of a NFC enabled device, with the option of saving the consumer's preferences.

SUMMARY

According to one aspect, the subject matter described herein includes methods, systems, and computer readable media of facilitating ordering and payment of goods and/or services through a single tap of a near field communication (NFC) enabled device. In one embodiment, a system is disclosed and may include a smart poster locatable in an area that is accessible to a potential consumer of goods or services. The system may further include a mechanism in or on the smart poster for directing the NFC enabled device to access a portion of a merchant ordering and payment system specific to the good or service advertised by the smart poster. The system may further include a wallet application residing on the NFC enabled device that upon interfacing with the smart poster downloads, submits, and pays for an order of the good or service advertised by the smart poster via the single NFC tap.

As used herein, the terms "wireless smart device" and "NFC enabled device" may be synonymous and are intended to refer to any device enabled with NFC, RF communication, or barcode capturing capabilities to interact with a smart poster with the corresponding technology. In one aspect, wireless device reader may include a radio frequency (RF) reader. One type of wireless device that can wirelessly communicate to a wireless smart device reader is an NFC card or NFC handheld device, including but not limited to a smart phone. In near field communication, a wireless smart device may communicate with a wireless transceiver or wireless device reader via inductive coupling of the reader antenna to the device antenna. The two loop antennas effectively form a transformer. The reader amplitude-modulates the radio frequency (RF) field to send information to the device. The device communicates with the transceiver and/or reader by modulating the loading on the device antenna, which also modulates the load on the reader antenna. In a wireless smart device, the NFC handset may enable contactless payment, and a security element (SE) for ensuring secure transactions may be embedded, provided by a universal subscriber identity module (USIM), or provided as an add-on to, for example, a SD or a jacket. Wireless smart devices may communicate with a transceiver or wireless device reader using NFC. As used herein, the term "wireless communication" includes communication conducted at ISO 14443 and ISO 18092 interfaces. These specifications define communication protocols for wireless smart devices operating in close proximity with a reader antenna.

The subject matter described herein may be implemented in software, in combination with hardware or in combination with hardware and firmware. For example, the subject matter described herein may be implemented in software executed by a processor. In one exemplary implementation, the subject matter described herein for facilitating ordering and payment of goods and/or services through a single tap of a NFC enabled device may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

The present subject matter describes various methods, systems, and computer readable media that may be utilized to facilitate the use of a wireless smart device enabled with NFC to order and pay for goods and/or services without the need for a sales agent and/or a payment register in addition to saving consumer preferences. The present subject matter may provide a consumer the opportunity to order goods and/or services via a single near field communication (NFC) tap using information downloaded and displayed on the consumer's mobile handset. Order and purchasing information may also be communicated using any wireless means of communication, such as 4G, 3G, GSM, GPRS, WiFi, WiMax, and other remote local or remote wireless communication using information obtained via the single NFC tap. In one embodiment, consumers may conveniently order and purchase desired goods or services in a manner that bypasses or obviates the need for a payment register in a retail location of the merchant (e.g., without having to present the product or payment at a point of sale register such that interaction with a sales clerk is unnecessary). At the end of the transaction, the consumer has the option of saving the order and/or purchase preferences for future reuse.

Figure 1:
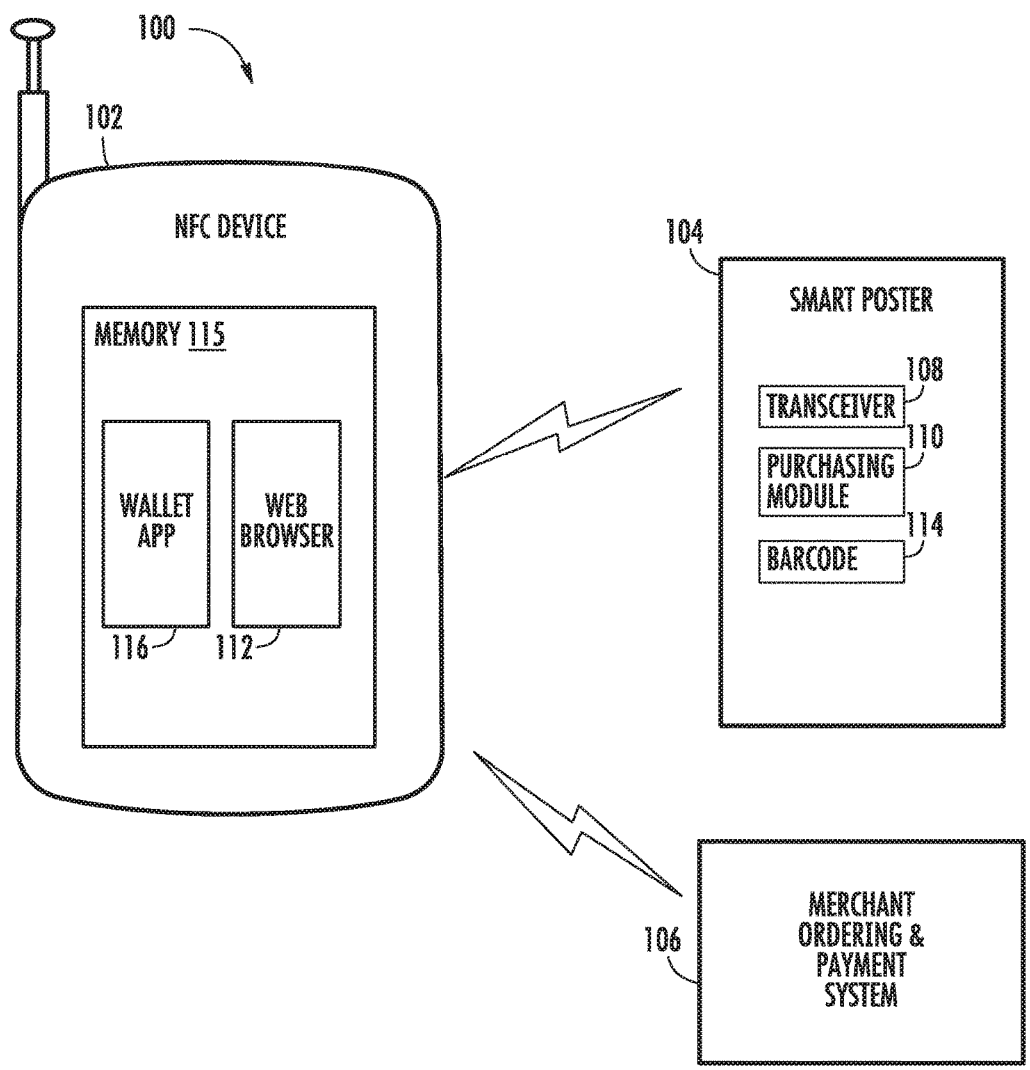
FIG. 1 is a schematic diagram illustrating an exemplary system facilitating multiple transactions through a single near field communication (NFC) tap according to an embodiment of the subject matter described herein.

FIG. 1 is a schematic diagram illustrating an exemplary system, generally designated 100 for facilitating the use of wireless smart devices to purchase products or services according to an embodiment described herein. Referring to FIG. 1, one exemplary system includes a wireless smart device such as an NFC enabled mobile device 102 or smart phone, a smart poster 104, and a merchant ordering and payment system 106 also known as backend server for facilitating in-store or near-store ordering and payment of goods and/or services through a single tap of NFC enabled device 102. Smart poster 104 may include any suitable two or three dimensional object that is locatable in any public place and accessible by potential consumers or purchasers of goods and/or services. Smart poster 104 may be located inside and/or near a retail establishment. For example, smart poster 104 may be located inside a Starbucks® or McDonalds®, for example, on a store wall, dining table, or other easily accessible location inside the store and may contain menu data accessible to NFC enabled device 102 via a single NFC tap, the smart poster 104 facilitating convenient ordering and purchasing options and thereby allowing consumers the option to bypass the cashier line. In another embodiment, a smart poster 104 could be located at a mall kiosk or common area near a retail establishment for ordering and purchasing items in a single NFC tap at near store locations. NFC enabled device 102 may be used to purchase in stock and/or out of stock items that may later be shipped to the consumer's home. Smart poster 104 may advertise goods and/or services. In one embodiment, smart poster 104 may include a shelf tag, product tag, product rack, or product label for ordering and purchasing items not in inventory.

In one embodiment, NFC enabled device 102 may obtain or receive information regarding the ordering and payment of goods and/or services via smart poster 104 when interfaced via a single NFC tap. Smart poster 104 may include a mechanism, such as a wireless transceiver 108 (e.g., a passive smart tag or circuit) for wirelessly communicating with NFC enabled device 102 via a single NFC tap, and allowing device 102 to obtain smart tag information regarding the order and purchase of various products. Such smart tag information may include information used to submit or place an order for goods, such as food menu items, a location identifier (e.g., a URI, URL, IP address, and the like) associated with a backend server in merchant ordering and payment system 106, and business card information. Business card information can include the name and address of the store in addition to other business card details for downloading and saving to NFC enabled device 102 for future reuse. In one embodiment, business card details could include details characterizing the goods or services provided by the business, such as food genres, type/genre of clothes (e.g., shoes, male fashion, female fashion, children fashion, boutique goods, Italian food, Indian food, etc.). In one embodiment, wireless transceiver 108 residing in or on the smart poster may direct the wireless smart device to access a portion of merchant ordering and payment system 106 specific to the good or service advertised by the smart poster (e.g., portion could include any of management server 118, content provider server 122, or website 120, FIG. 2).

In one embodiment, wireless transceiver 108 includes a passive NFC or RF tag device (e.g., a smart tag or circuit) that is powered by an interfacing NFC enabled device 102. For example, after NFC enabled device 102 is tapped or brought in close proximity with wireless transceiver 108, wireless transceiver 108 may be activated by obtaining power from the electromagnetic field generated by NFC enabled device 102. In other embodiments, transceiver 108 may include an active RF tag or reader equipped with its own power source. Whether passive or active, transceiver 108 is capable of communicating smart poster content information when NFC enabled device 102 interfaces with smart poster 104. In one embodiment, the smart poster content information may include a menu item identifier, a content provider code (CLC), a tag location code (TLC), and a location identifier (e.g., an IP address, a URL, a URI, and the like) associated with one or more backend servers in the merchant ordering and payment system 106. In further embodiments, wireless transceiver 108 may include an NFC or RF antenna and a processor that executes a product information/purchasing module 110 to direct NFC enabled device 102 to information (e.g., a website) regarding products or services available for order and purchase. In one example, wireless transceiver 108 may communicate via an NFC tap a location identifier associated with the merchant ordering and payment system 106 to NFC enabled device 102.

In one embodiment, where there is no wireless network signal or a wireless outage, NFC enabled device 102 may read ordering information from NFC tag device and store the order information. Order information may be conveyed to an NFC device reader (not shown) to submit and process the order.

Figure 2:
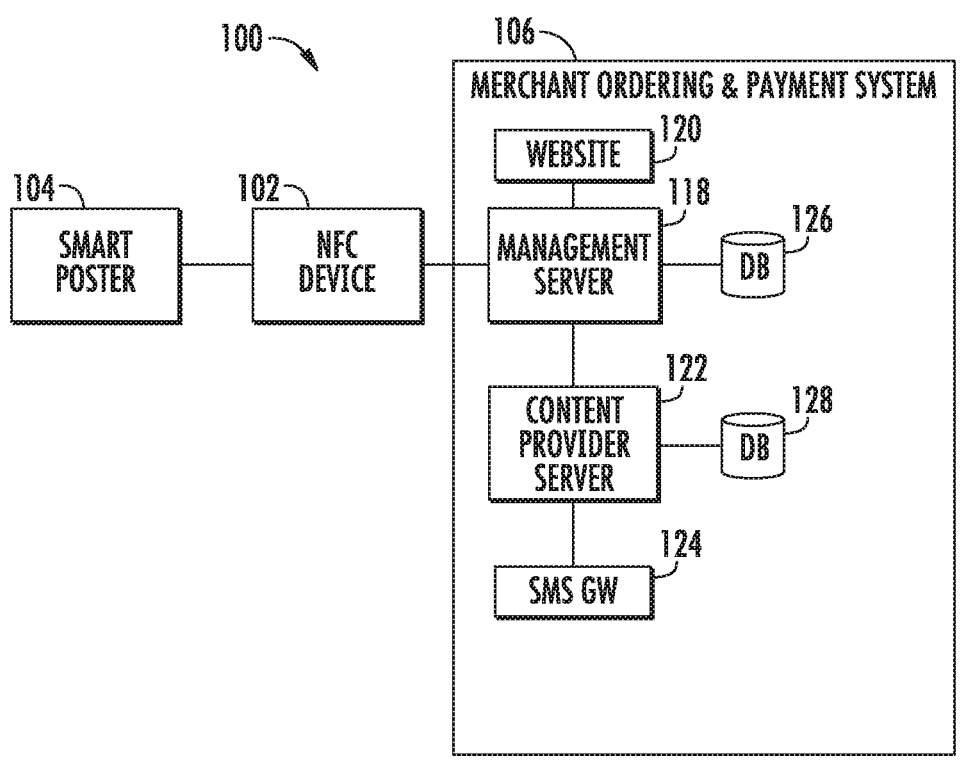
FIG. 2 is a block diagram is illustrating the system of FIG. 1 for facilitating the use of NFC enabled device for purchasing goods or services through a single NFC tap according to an embodiment of the subject matter described herein.

Still referring to FIG. 1, device 102 may also receive information regarding the ordering and payment of goods and/or services via interfacing with a barcode 114 included on smart poster. NFC enabled device 102 may include a camera that is used to scan or capture barcode 114 on smart poster 104. Barcode 114 may include a location identifier associated with the merchant ordering and payment system 106 for ordering and purchasing goods and/or services. An application of NFC enabled device 102 may read the barcode captured by the camera and extract the encoded information for directing the NFC enabled device 102 to merchant's website and/or a backend server or system 106 location for ordering and purchasing a merchant's goods. For example, such an application may be configured to read barcodes from jpeg or other image data captured by the camera. Barcode 114 may direct NFC enabled device 102 to the location of merchant ordering and payment system 106 using for example, a URL, an IP address, or a URI.

Where wireless transceiver 108 and/or barcode 114 provide a location identifier associated with the merchant ordering and payment system 106 a wallet application 116 is configured to contact a specialized server (e.g., a management server 118 FIG. 2) that may access a database that maps identification numbers to content provider servers to get content data (e.g., content provider server 122 in FIG. 2). The specialized server may then use a CLC to contact server 122 to obtain content data associated with the tapped smart poster 104 menu item.

NFC enabled device 102 may initiate wallet application 116 upon interfacing with smart poster 104. Wallet application 116 may use a location identifier (e.g., a URL, URI, or IP address) contained in smart poster 104 to communicate with system 106 in order to obtain content and display information (e.g., content and display information for á la carte menu items, sizes, quantities, etc.) regarding the desired product. A content provider code received by device 102 from a transceiver of smart poster 104 can be provided to a backend server in system 106, which in turn may use the CLC to extract content data from content provider server 122. The content data may include data corresponding to the specific menu item that was conveyed through the NFC tap. An OTA provisioning server (FIG. 4) may be used to download content information that is displayed on NFC enabled device 102.

Wallet application 116 may also receive optional store business card information. As part of the in-store or near-store ordering systems and methods described herein, when the user or consumer interfaces NFC enabled device 102 with smart poster 104, the business card of the store may be downloaded along with the order code, and the user has the option to store the order with the business card information for future reuse. In one embodiment, wallet application 116 and web browser 112 may reside in a memory element 115 of NFC enabled device 102. Wallet application 116 may be stored in a secure memory element of NFC enabled device 102 or in a non-secure baseband memory without departing from the scope of the present subject matter.

Wallet application 116 may include a software application (e.g., a midlet or smart card web server applications) that when executed by a processor in NFC enabled device 102 manages multiple softcards stored on the mobile device, such as credit cards, debit cards, electronic loyalty cards, electronic loyalty reward certificates, electronic coupons, electronic tickets, and the like. Electronic payment softcards including credit or debit cards may be stored in any suitable priority or within wallet application 116. For example, the user can set wallet application 116 such that a Visa® debit card is always used as a first priority. Or, wallet application 116 may be programmed to use certain electronic payment softcards in certain situations. For example, wallet application 116 may be programmed to pay using a Macy's® softcard (e.g., an electronic software based card stored and displayed via device 102) when in a Macy's® store. GPS or triangulation methods executed on NFC enabled device 102 could be used to determine when in a certain location, such as a Macy's® store (e.g., when device 102 is interfaces with a wireless reader in Macy's®). User preferences can be used to prioritize electronic softcards residing within wallet application 116. Wallet application 116 may also include an algorithm for submitting and paying for the order code or information downloaded from smart poster 104 at merchant ordering and payment system 106. In one embodiment, wallet application 116 may present the user with the following options, (i) the option to "Order and Pay", or (ii) the option to "Create and Submit Order".

In one embodiment, NFC enabled device 102 can tap a predefined order menu displayed on smart poster 104 and receive information including a content code, a location identifier associated with merchant ordering and payment system 106 (e.g., URL, IP address, or URI of a backend server in system 106) and store business card information. Consumer may interface NFC enabled device 102 with smart poster 104 to download a menu option identifier and an associated content provider code for a specific menu option via the NFC tap to device 102. The "Order and Pay" option may be selected to wirelessly communicate the order and payment information and phone number to the merchant ordering and payment system 106 for processing and check out. The consumer may be notified about payment confirmation via a short messaging service (SMS) message, a multimedia messaging service (MMS) message, or via a digital receipt. Wallet application 116 may communicate an order identification code, user phone number, and payment credentials to merchant ordering and payment system 106 identified by the URL, IP address, or URI provided by smart poster 104. Orders can be stored in wallet application 116 for future reference and submission, which may be advantageous as consumers will not have to recreate a new offer every time they enter or are near a store. Also of note, when an order is placed using predefined payment instruments such as electronic softcards, the payment process is automated and the merchant ordering and payment system 106 can send an order confirmation via SMS, MMS, or digital receipt. Thus, consumers can place and pay for orders without the need to wait in line for a cashier to handle the offer.

In another embodiment, NFC enabled device 102 can tap to download a content or order identification code for á la carte menu, specify choices, and place the order with payment via the single NFC tap. In this embodiment, users may select the "Create and Submit Order" option on NFC enabled device 102. For orders that give the consumer the option to specify their preferences, the user will be able to download the order, create an order based on user preferences, and submit the order using virtual payment instructions when directed to system 106. The user has the ability to save the order within wallet application 116 for future reordering purposes. This is advantageous as orders can be reused without having to be recreated or reselected. In this embodiment, the consumer may use NFC enabled device 102 to access system 106 and specify choices from various menu item choices, sizes, and details of the product via web browser 112 or wallet application 116. Upon selection of the "Create and Submit Order" option the consumer is presented with choices and can make the appropriate menu selections. The menu selection or order, payment credentials, and the phone number of NFC enabled device 102 can then be communicated to merchant system 106 for processing. The order and purchase transaction may be made with an electronic payment softcard residing in wallet application 116. If no payment option is set, the user may be prompted to select a payment instrument from the list of payment instruments available in wallet application 116. Notably, the purchase for the desired product is conducted in a manner that bypasses (or obviates the need for) a payment register and/or cashier in a retail location of the merchant (e.g., without interacting with a sales clerk and/or without the use a payment register or point of sale terminal). Also of note, orders can be stored in wallet application 116 for future reference and submission. This advantageous simplifies the ordering process thereby saving consumers time. For example, the consumer may be notified about saved or stored orders previously placed with a given merchant, the user then has the flexibility to submit the same order or place a new order. Saved or stored orders may also be modified and resubmitted with new preferences, for example, a previous order of a hamburger cooked medium could be changed to medium-well. The new order can then be saved to NFC enabled device 102.

FIG. 2 is a block diagram illustrating system 100 for facilitating the use of NFC enabled devices for ordering and purchasing goods or services according to an embodiment of the subject matter described herein. Such system can be used to store orders and recall the stored orders, including payment preferences for future reuse. Notably, system 100 can automate the ordering and payment process and allow orders to be processed without the need for a cashier and/or point of sale (POS) terminal. FIG. 2 includes NFC enabled device 102 which interfaces smart poster 104 via a single NFC tap. Smart poster 104 may be located inside a store or near a store supported by a merchant and/or manufacturer. Smart poster 104 may communicate the URL, IP address, or identification number of merchant ordering and payment system 106. For example, a user may utilize NFC enabled mobile device 102 to acquire or "pull" identification data (e.g., URL, IP address, URI, or content data for a specific menu item) from a passive or active smart tag of smart poster 104. After interfacing with smart poster 103, NFC enabled device 102 may initiate wallet application 116 that is responsible for transmitting the identification data and subscriber identification information (e.g., the customer's NFC enabled mobile device number) to a management server 118 of system 106. For example, wallet application 116 may send the information obtained from smart poster 104 to management server 118 (e.g., a trigger management server or content management server) of system 106 to request and pay for the goods or services, such as menu item(s) advertised by the smart poster. Although a single management server 118 is shown in FIG. 2 to be connected to a single content provider server 122, network architecture utilizing additional management servers (e.g., an mTrigger Manager server and an mContent Manager server produced by ViVOtech, Inc.) and additional content provider servers may be employed without departing from the scope of the present subject matter.

In one embodiment, ordering and payment system 106 may include management server 118 that manages NFC enabled devices or tags, a merchant website 120 that allows consumers to browse and purchase goods or services offered by the merchant, a content provider server 122 that provides content based on a content code of tapped goods or services advertised by smart poster 104, and an SMS gateway 124 (or MMS gateway or WAP) for providing an electronic receipt or confirmation of the order and purchase. The order or content may be downloaded to NFC device 102 by management server 118, which uses smart poster content data from smart poster 104 to obtain content data from content provider server 122.

In one embodiment, interfacing NFC enabled device 102 with smart poster 104 associated with a particular merchant allows NFC enabled device 102 to select and ultimately download orders for electronic goods or services (e.g., predefined menu item(s), á la carte menu items) to NFC enabled device 102 by first communicating a request to management server 118. The request can include the location of server 118 and optionally a content provider code or order identifier for the item advertised by smart poster 104. In one embodiment, management server 118 includes an intelligent server that has been configured to receive request messages from consumers or subscribers via direction from smart poster 104. For instance, upon interfacing with smart poster 104, NFC enabled device 102 may transmit an electronic request message that provides management server 118 with identification data associated with the interfaced smart poster 104, order or content identification data associated with the item advertised by smart poster 104, and subscriber identification information such as the mobile telephone number. Where a CLC is provided, management server 118 may use an associated identifier number or data contained in database 126 to query and obtain the destination IP address of content provider server 122 containing the content data advertised/displayed by smart poster 104. A request message may then be routed from server 118 to the correct content provider server by obtaining the destination IP address of the content provider server 122 from database 126. Content provider server 122 may query database 128 to locate and provide the appropriate content associated with smart poster 104, such as menu item to mobile device 102.

Although only one content provider server 122 is illustrated in FIG. 2, additional content provider servers may be employed without departing from the scope of the present subject matter. In one embodiment, management server 118 may be responsible for receiving requests from NFC enabled device 102 and for forwarding each request to an appropriate content provider server. As used herein, the term "merchant" may include a seller, a retailer, or any other entity that is in the business of selling goods or providing services. In one embodiment, content provider server 122 may comprise a backend content provider server that is associated with a particular merchant such as a retailer, manufacturer, service provider, or Internet-based store. In one embodiment, content provider server 122 may include a server that is associated with a plurality of merchants, manufacturers, companies, and the like. Content provider server 122 may be configured to associate and extract various electronic certificate data, such as data corresponding to pre-defined menu items, á la carte menu items, coupons, promotional data, prepaid cards, loyalty cards, credit/debit cards, and/or product information from database 128. In one embodiment, content provider server 122 can query database 128 using, for example, order or content identification data associated with the item advertised by smart poster 104 to send the relevant content data (e.g., menu item, offer, or coupon) to be processed and subsequently passed to SMS gateway 124 for generating an electronic receipt communicated to NFC enabled device 102 based upon the mobile telephone number provided to management server 118. In one embodiment, management server 118 may forego using SMS gateway 124 and may instead utilize an over-the-air (OTA) provisioning server (FIG. 4) to provide the electronic certificate or digital receipt to NFC enabled device 102.

Figure 3:
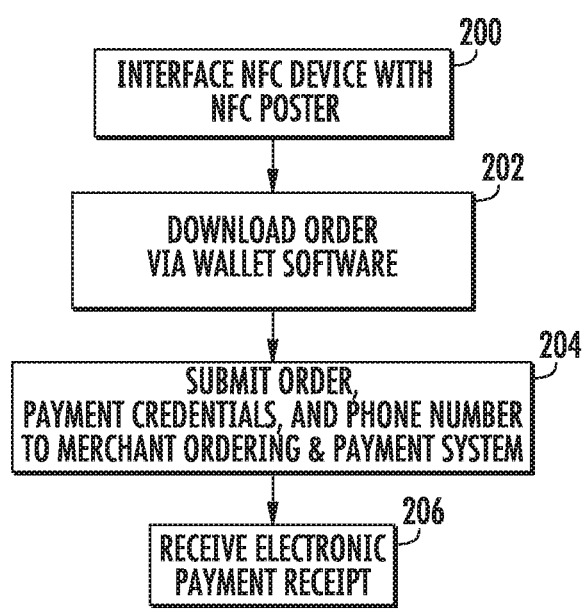
FIG. 3 is a flow chart illustrating an exemplary process for facilitating multiple transactions through a single NFC tap according to an embodiment of the subject matter described herein.

FIG. 3 is a flow chart illustrating an exemplary process for facilitating the use of NFC smart devices to purchase goods or services according to an embodiment of the subject matter described herein. Referring to FIG. 3, in step 200, NFC enabled device 102 is interfaced with smart poster 104. Smart poster may be located in an area accessible by a potential consumer of a good or service is provided. Smart poster 104 may be disposed within and/or near a merchant establishment. In one embodiment, smart poster 104 may be located in any public place. For example, a smart poster selling a DVD could be located outside a bus station, movie theater, or airport. Upon interfacing NFC enabled device 102 with smart poster 104, NFC enabled device 102 may be directed to access a portion of a merchant ordering and payment system specific to the good or service advertised by the smart poster. The DVD, or any type of good and/or service, could be ordered, purchased, and shipped via the single tap using wallet application 116 which contains preselected payment information and shipping information saved to application 116.

In block 202, an order is downloaded, or requested via wallet software 116 of NFC enabled device 102. NFC enabled device 102 is directed, using a mechanism in or on smart poster 104, to download an item from a merchant content provider server 122 specific to the good or service advertised on smart poster 104. A mechanism, such as barcode 114 or transceiver 108, may direct NFC enabled device 102 to access a portion of merchant ordering and payment system 106 specific to the good or service advertised by the smart poster. In one embodiment, consumer may tap a specific menu option which downloads the order to NFC enabled device 102 via association of content data via content provider server 122. This action can prompt wallet software 116 to execute the "Order and Pay" option. Upon execution of "Order and Pay", the order and payment information may be sent to system 106 to process the order and payment. In another embodiment, a consumer may tap to download an á la carte menu, specify choices, and request and submit the order with payment. The consumer may select the "Create and Submit Order" option to make choices, submit the order, payment credentials, and phone number to system 106. Wallet application 116 may be used to access, display, and select the online product information/content using content provider server 122 or website 120.

In block 204, the consumer may use NFC enabled device 102 to submit an order for goods or services along with payment credentials and mobile phone number to merchant ordering system 106. Payment credentials will be processed by merchant ordering and payment system 106 to pay for the desired good, and details such as a quantity, color, size, or the like can be specified using wallet application 116. In one embodiment, one or more of these characteristics may be associated with the specific URL or IP address provided by smart poster 104. In other embodiments, one or more characteristics may be associated with an order identifier obtained from smart poster 104 and later associated with content provider server 122. For example, each different size, item, and/or color of the desired product may each be associated with a unique URL, IP address, order identifier, or shelf tag managed and processed via management server 118 and later associated using database 126 with a destination address of server 122 or website 120. Server 122 can provide content associated with an order identifier. Website 120 can allow a consumer to place an order. Wallet application 116 can be used to download the order obtained using server 122 or website 120 for a good or service to NFC enabled device 102 and execute one of the "Order and Pay" or "Create and Submit Order" options to submit the order and payment information to the merchant ordering and payment system 106. Wallet application 116 may be preloaded with one or more payment credentials including electronic softcards (such as an electronic credit, debit, check, prepaid or payment or non-payment card) to purchase goods. If no payment credential is pre-set, the consumer may be prompted to select a payment instrument from the list of payment instruments in wallet application 116. Wallet application 116 may also be preloaded with consumer information such as addresses used for shipping and billing, personal information such as preferences and others that allows the consumer to complete the purchase transaction without the use of a payment register.

In block 206, NFC enabled device 102 can receive an electronic payment receipt based upon the mobile phone number submitted to merchant ordering and payment system 106. In one aspect, the payment receipt can be sent via text message via SMS gateway 124. Notably, systems and methods described herein can be used to purchase the desired good or service in a manner that bypasses (or obviates the need for) a payment register in a retail location of the merchant (e.g., without having to interact with a sales agent or without the use of a payment register or cashier).

As an additional and optional step, the consumer or user has the option to save and/or store the order in wallet application 116 of NFC enabled device 102 for future reference and submission along with business card information that may be obtained from smart poster 104. Orders may be also organized within wallet application 116 based upon business card information such as business name, food characteristics or genres, store characteristics or genres (e.g., burgers, fondue, vegan, shoe store, book store, children store, etc.) In one embodiment, consumers may place new orders from a merchant via wallet application 116 to execute a previously stored order and payment without interfacing NFC enabled device 102 with poster 104. In one embodiment, when placing a new order, the consumer may be notified about the previously placed and saved order. This would advantageously give the consumer the flexibility to submit the same order as used the last time, modify the saved order, or place an entirely new order. In one embodiment, consumer may choose to modify an existing order and store it as a newly defined order. For orders that give the consumer the option to specify preferences, the consumer will be able to download the order, create an order based on consumer preferences, and submit the order via virtual payment instruments communicated via wallet application 116.

In the examples described above, purchase transactions using NFC-enabled subscriber devices are described. In alternate examples, purchase transactions using other interactive wireless technologies, such as radio frequency (RF) or barcode (e.g., UPC tags) enabled devices may be facilitated. In addition, the type of device with the integrated smart technology is not limited to mobile phones. Also, as described above, the present subject matter describes scenarios where goods or services may or may not be located at the consumer's location. When the desired product is not at the consumer's location, the consumer's billing, shipping, and payment information may be pre-stored in wallet application 116 and used to facilitate the transaction. Therefore, after conducting the purchase transaction, wallet application 116 may communicate the stored shipping address to merchant system 106.

Alternatively, the consumer may enter billing and shipping information manually. When the desired product is present at the consumer's location, the present subject matter may be utilized by a consumer or merchant for the sake of convenience. For example, the consumer may simply desire to use the present subject matter if the consumer requires a prompt purchase transaction without paying for the goods at a payment terminal/register manned by a sales clerk (e.g., avoid waiting in line at the cashier) or wishes the product to be mailed to a designated shipping address (e.g., the consumer has other shopping destinations and does not wish to carry the product around or does not want to transport the product home). In scenarios such as these, the consumer simply needs to tap NFC enabled device 102 to the smart poster 104 in order to obtain URL information related to the merchant system 106. The merchant system 106 then provides the NFC enabled device 102 with information associated with the product (e.g., wirelessly via server or website) and the consumer makes his product and option selections. Once the consumer makes his purchase as described above, merchant system 106 may send an electronic payment receipt (e.g., via email or an electronic download via 3G, 4G, WiFi, etc.) to NFC enabled device 102 and/or to the merchant store visited by the consumer. Since a legal purchase has been made, the consumer may carry the purchased product from the store premises. In case of signal failure or wireless outage, the order and payment stored in wallet application 116 could be transferred to a wireless device reader, such as a POS terminal 415 (FIG. 4) via an NFC tap.

Figure 4:
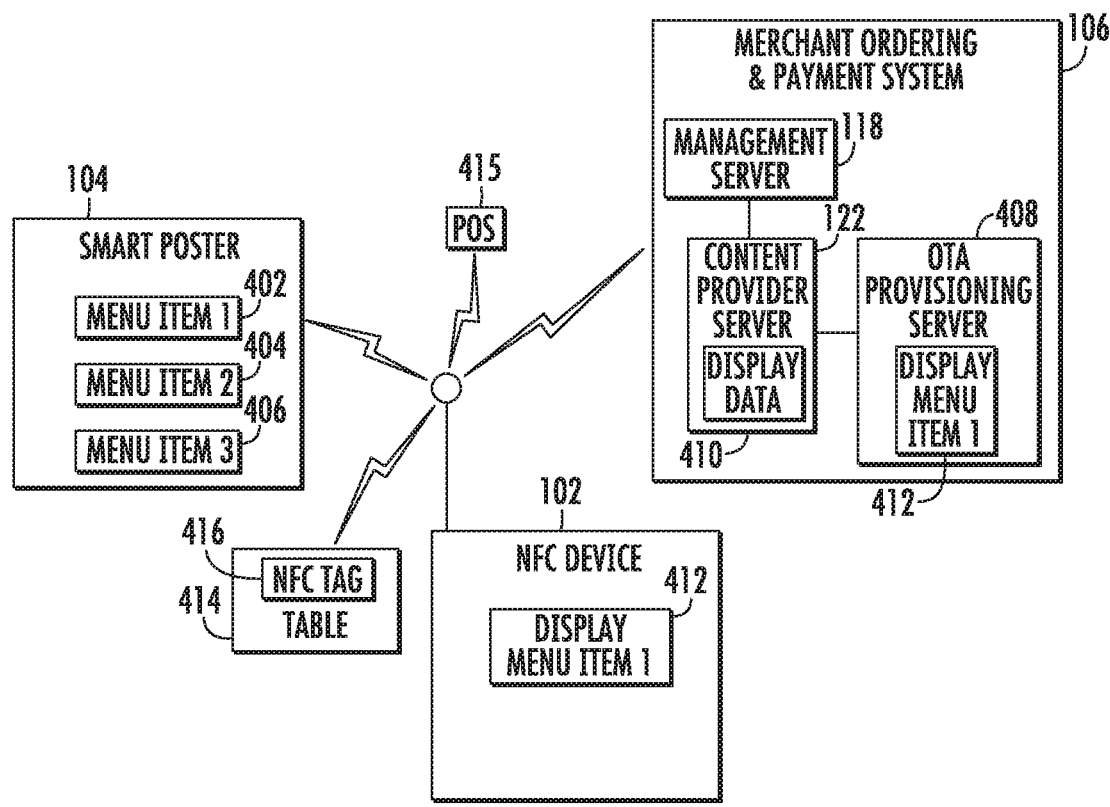
FIG. 4 is a schematic diagram illustrating an exemplary system facilitating multiple transactions through a single near field communication (NFC) tap according to another embodiment of the subject matter described herein.

FIG. 4 is a further embodiment illustrating an exemplary system for facilitating the use of wireless smart devices to purchase products or services. System may include NFC enabled device 102, smart poster 104, and a merchant ordering and payment system 106 as previously described. In one embodiment smart poster 104 includes a menu item 1, 402, a menu item 2, 404, and a menu item 3, 406. Any number of menu items may be displayed and advertised on smart poster 104. Each menu item may include an NFC tag for communicating a menu option identifier or CLC associated with the advertised menu item to device 102. For example, menu item 1, 402 may include a menu option identifier associated with a menu option for a ham sandwich. Menu option identifier or CLC may be pulled onto NFC enabled device 102 from poster 104 via an NFC tap upon interfacing device 102 with poster 104. The NFC tap may also provide a location identifier associated with backend merchant ordering and payment system 106. The NFC tap may transmit the menu option identifier associated with the ham sandwich menu option from poster 104 to system 106. Content provider server 122 may associate the menu option identifier or CLC with display content data 410 for that specific menu item, for example, data associated with a picture and price corresponding to the advertised ham sandwich. Display content data 410 may be provided to OTA provisioning server 408 which is configured to package the display content data in a format (e.g., Display data for menu item 1, 412) that can be displayed by device 102. Display data for menu item 1, 412 may then be downloaded to NFC device 102. That is, OTA provisioning server 408 may generate display data that NFC device 102 may be received and processed by wallet application 116 and presented to user via a screen display. The user may then confirm and/or modify the order displayed on the screen by pressing the display, and the wallet application may then send the order to the backend server or system 106 for processing. In one embodiment, the user may confirm and/or modify the order displayed on the screen by pressing the display and then tapping NFC enabled device 102 to a NFC reader, such as POS terminal 415 at the store/restaurant location to complete the transaction. Wallet application 116 of device 102 may also be used to transmit a preselected payment to backend ordering and payment system 106 to complete the transaction and optionally save the transaction for future reuse.

The system illustrated by FIG. 4 may further and optionally include a POS terminal 415 and/or table 414. POS terminal 415 includes a point of sale terminal which could optionally be tapped to submit an order for display menu item 1, 412 that has been downloaded onto NFC device 102 and pay for the item. That is, wallet application 116 may download and/or display an order for a menu item (as mentioned above), and then interface with POS terminal 415 via a single NFC tap to place and purchase the order. Table 414 may include an NFC tag 416 which could communicate a table identifier to a server at the store location or the backend merchant ordering and payment system 106 (which is in communication with the store location). The table identifier could be processed and associated with the customer's order thereby allowing the order to be delivered to a specific table or location in a restaurant.

It is understood that various details of the presently disclosed subject matter may be changed without departing from the scope of the presently disclosed subject matter. Furthermore, the foregoing description is for the purpose of illustration only, and not for the purpose of limitation.

What is claimed is:
1. A system comprising:
a smart poster that is located in an area accessible to a potential consumer of goods or services and includes a content code and a location identifier that can be used to access content data specific to a good or service advertised by the smart poster;

a merchant ordering and payment system that receives and processes an order and a payment for the good or service advertised by the smart poster; and a wireless smart device that is configured for wirelessly obtaining the content code and the location identifier from the smart poster, using the location identifier to establish communication with the merchant ordering and payment system, using the content code to obtain the content data specific to the good or service from the merchant ordering and payment system, initiating an order for the good and service based on the content data, and submitting the order and associated payment information stored within the wireless smart device for the good or service to the merchant ordering and payment system such that both the order and the payment bypass a point-of-sale terminal when communicated by the wireless smart device to the merchant ordering and payment system.

2. The system of claim 1, wherein a wallet application in the wireless smart device saves the order for future reuse.

3. The system of claim 2, wherein the wallet application recalls the saved order.

4. The system of claim 3, wherein the wallet application modifies the recalled order.

5. The system of claim 1, wherein the smart poster communicates business card details to the wireless smart device.

6. The system of claim 1, wherein the smart poster is located in a retail establishment.

7. The system of claim 6, wherein the smart poster is located on a wall, table, or other accessible location inside the retail establishment.

8. The system of claim 1, wherein the smart poster is located outside a retail establishment.

9. The system of claim 1, wherein a wallet application in the wireless smart device is pre-loaded with electronic softcards for payment of the order.

10. The system of claim 1, wherein the good or service advertised by the smart poster is shipped to the consumer using an address saved to a wallet application in the wireless smart device.

11. The system of claim 1, wherein a wallet application in the wireless smart device prompts the consumer to make choices before submitting the order.

12. The system of claim 1, wherein a wallet application in the wireless smart device interfaces with a point of sale (POS) terminal via a single near field communication (NFC) tap to place and purchase the order.

13. A method comprising:
interfacing a smart poster with a wireless smart device to wirelessly communicate to the wireless smart device a content code and a location identifier that are stored on the smart poster and can be used to access content data specific to a good or service that is advertised by the smart poster, the smart poster locatable in an area that is accessible to a potential consumer of goods or services;

communicating, by the wireless smart device, the content code to a merchant ordering and payment system using the location identifier;

providing, by the merchant ordering and payment system to the wireless smart device, the content data associated with the good or service identified by the content code obtained from the smart poster; and receiving, by the merchant ordering and payment system from the wireless smart device, an order and associated payment information stored within the wireless smart device for a good or service, wherein both the order and the payment bypass a point of sale terminal when communicated by the wireless smart device to the merchant ordering and payment system.

14. The method of claim 13 comprising saving the order for future reuse.

15. The method of claim 14 comprising recalling the saved order.

16. The method of claim 15 comprising modifying the recalled order and saving the modified order.

17. The method of claim 13 comprising communicating one or more business card details to the wireless smart device.

18. The method of claim 17 comprising saving the order for future reuse, and associating the one or more business card details with the saved order.

19. The method of claim 13, wherein paying for the order comprises submitting a preset electronic softcard to the merchant ordering and payment system.

20. The method of claim 13 comprising shipping the order to the consumer using an address saved to a wallet application in the wireless smart device.

21. The method of claim 13 comprising making choices regarding the downloaded order before submitting the order.

22. The method of claim 13 comprising receiving an electronic receipt of the order via a short messaging service (SMS) message.

23. The method of claim 13, comprising receiving an electronic receipt of the order via a multimedia messaging service (MMS) message.

24. A non-transitory computer readable medium having stored thereon comprising computer executable instructions that when executed by a processor of a computer performs steps comprising:

interfacing a smart poster with a wireless smart device to wirelessly communicate to the wireless smart device a content code and a location identifier that are stored on the smart poster and can be used to access content data specific to a good or service advertised by the smart poster, the smart poster locatable in an area that is accessible to a potential consumer of goods or services;

communicating, by the wireless smart device, the content code to a merchant ordering and payment system using the location identifier;

providing, by the merchant ordering and payment system to the wireless smart device, the content data associated with the good or service identified by the content code obtained from the smart poster; and receiving, by the merchant ordering and payment system from the wireless smart device, an order and associated payment information stored within the wireless smart device for a good or service, wherein both the order and the payment bypass a point of sale terminal when communicated by the wireless smart device to the merchant ordering and payment system.

* * * * *